July 25, 1933.    L. E. SHAW    1,919,534
MOLDING APPARATUS
Filed Nov. 3, 1928    3 Sheets-Sheet 1

INVENTOR.
LOUIS E. SHAW
BY
ATTORNEYS.

July 25, 1933.  L. E. SHAW  1,919,534
MOLDING APPARATUS
Filed Nov. 3, 1928   3 Sheets-Sheet 2
Fig. 3.
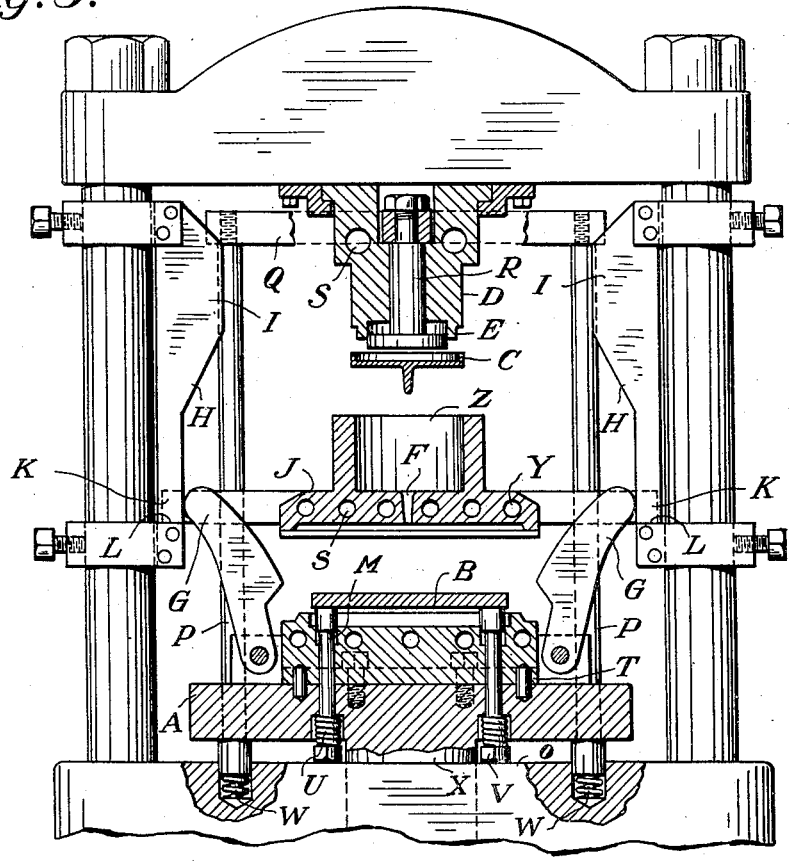
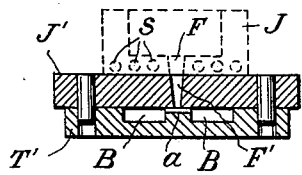
Fig. 4.
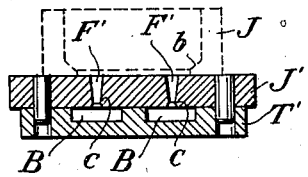
Fig. 5.
INVENTOR.
LOUIS E. SHAW
BY James and Franklin
ATTORNEYS.

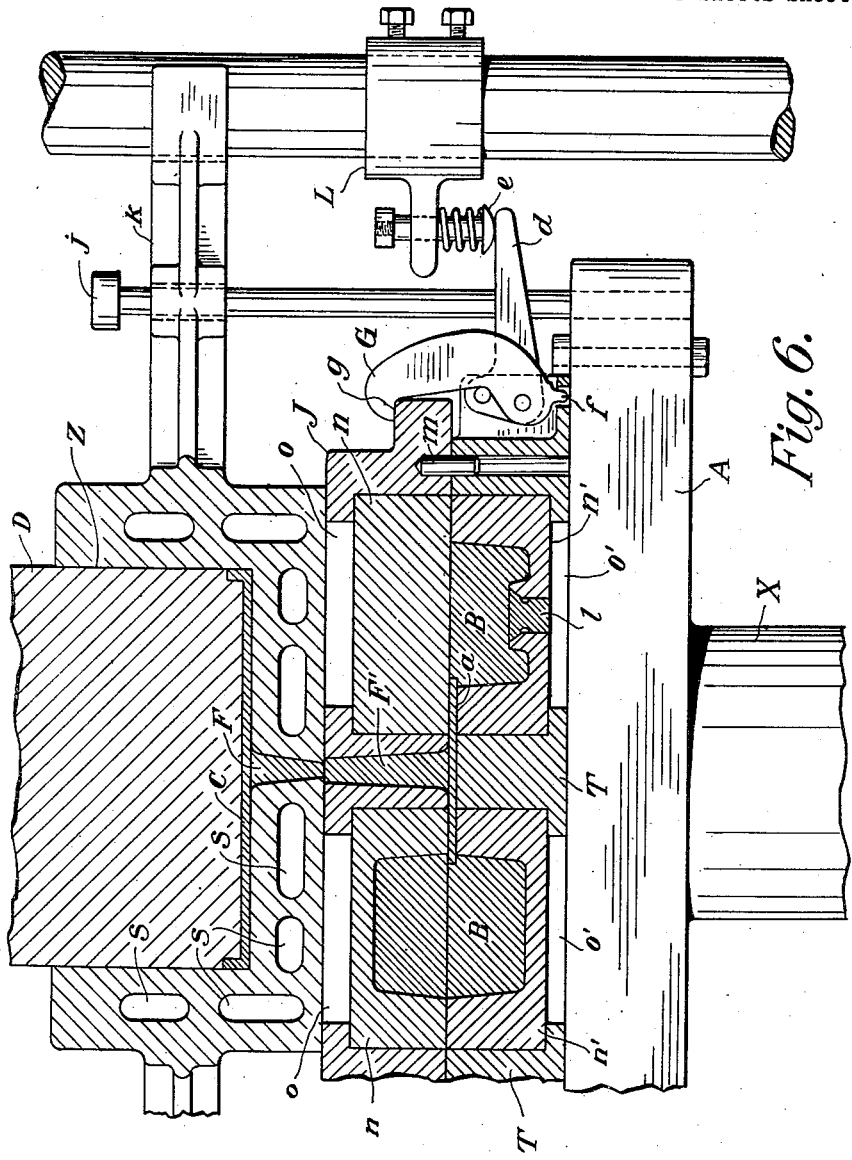
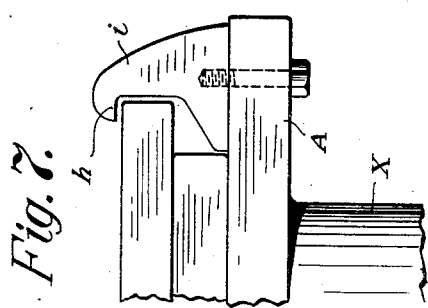
INVENTOR.
LOUIS E. SHAW

Patented July 25, 1933

1,919,534

UNITED STATES PATENT OFFICE

LOUIS E. SHAW, OF EAST ORANGE, NEW JERSEY, ASSIGNOR TO JOHN STOGDELL STOKES, OF SPRING VALLEY FARMS, PENNSYLVANIA

MOLDING APPARATUS

Application filed November 3, 1928. Serial No. 316,967.

This invention relates to molding apparatus through the agency of which an article may be rapidly, conveniently and economically molded of thermoplastic materials through the aid of heat and hydrostatic pressure.

More particularly my invention embraces apparatus for molding potentially reactive infusibly thermosetting resinous materials consisting essentially of subjecting a mass of material contained in a pressure chamber to heat for the purpose of rendering it plastic; and to pressure for the purpose of forcing the plastic material into a mold cavity through a passage or passages of relatively small cross-sectional area wherein the material is more uniformly heated and whereby only a relatively small volume of material is in motion therethrough at one time, preventing violent surges under pressure and permitting the application of high pressures in an economical and inexpensive manner.

The apparatus is so designed as to permit the operation of a method to insure the material being in a highly plastic state when it enters the mold cavity in order that it may flow freely into all the interstices thereof.

A further object of my invention is to provide facilities for the rapid heating of the plastic material to a temperature closely approaching that at which chemical reaction takes place for the purpose of hastening the conversion of a potentially reactive plastic mass into an article of desired form and to cause the potentially reactive plastic mass to assume a hard, set and final stage while retained within the confines of the mold cavity.

My apparatus further provides a mold cavity or cavities which may be closed to the final dimensions of the part to be molded or formed prior to the introduction of the molding material therein, to insure greater dimensional accuracy of the molded parts; a positive hydrostatic pressure on the material within the mold cavity, a freedom from undesired fins, and the elimination of a large part of the air and occluded gases from the mold cavity during the filling of such mold.

With the above recited objects and others of a similar nature in view, my invention consists of the construction, combination and arrangement of parts set forth in and falling within the scope of the appended claims.

In the accompanying drawings

Fig. 3 is a view similar to Fig. 1 showing the ejection of the molded piece and the excess material from the plunger of the reservoir;

Fig. 4 is a vertical section through a modified form of mold illustrating how a multiplicity of mold cavities may be supplied with material through a single passage;

Fig. 5 is a view similar to Fig. 4 showing a plurality of mold cavities supplied with material through a multiplicity of passages;

Fig. 6 is an elevation partly in section showing a form of apparatus adapted to the quick handling of molds standardized as to outside dimensions; and Fig. 7 is an elevation showing a method of guiding the mold into position under the pressure chamber.

Figure 1:
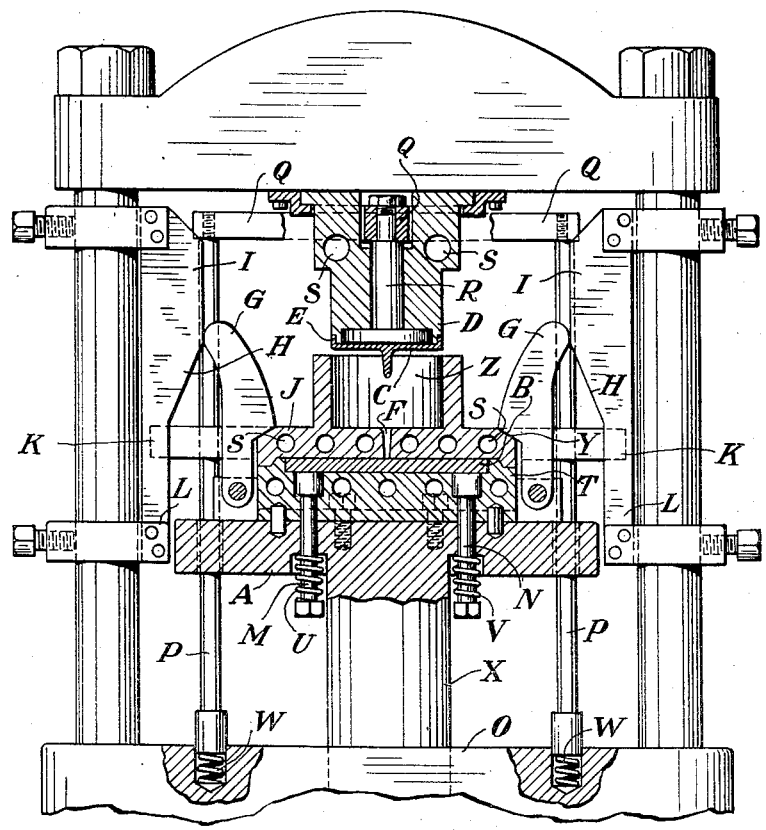
Fig. 1 is an elevation partly in section showing one form of apparatus suitable for my purpose and illustrating the position of the parts after the piece has been molded but before being ejected from the mold.

In Fig. 1 I have illustrated the position of the apparatus after the molding operation has been completed and the platen A of a suitable press has started on its downward movement. The molded piece B is shown filling the molding cavity, and the excess material C is shown clinging to the plunger D, due to its shrinking on the cylindrical undercut portion E of the plunger. The excess material filling the gate or passage F has readily broken off without injury to the molded piece B because of the weak thin cross section of material formed in the passage F. As the platen moves downward from the position shown the locking member G will be released by reason of the incline H of cam I. The top member J of the mold is provided with lateral bifurcated arms K which will next abut against the stops L holding the member J from further descent and forcing the locking member G outward because of the inclined surface Y.

During the very last of the platens downward movement the knockouts M and N will strike against the base of the press O and their upper ends will force the molded piece B out of the mold cavity. Simultaneously knockout rods P will be forced downward by the platen and by means of bar Q will cause knockout R to move downward stripping the excess material C from off the plunger D.

The two mold members T and J and the plunger D have conduits S therein, indicating a means for heating as through the circulation of steam.

After the platen has reached its lowest point and the molded piece and the excess material have been removed, it will be raised far enough to allow the knockouts M and N to drop into their lowest positions and knockout R to be raised to its highest position, this movement being caused by the springs U, V and W respectively.

The press is now in position for the reception of another quantity of molding material which is placed in the pressure chamber Z and the upward movement of the platen continued. As the platen moves upward it will first lift the top member J of the mold away from the stops L, and the locking members G will then be forced inward by the faces H of the cams. Further upward movement of the platen places the material in the pressure chamber under the predetermined pressure desired while, at the same time, the application of heat in the fluids passed through the conduits S, will cause the material to soften first along the contacting metallic surfaces of the plunger D and the pressure chamber J and flow will ensue from such surfaces through the passage F carrying with it more or less ununiformly softened or heated material which will be uniformly heated to a relatively high temperature and plasticity because of the narrow cross-section of the passage F and its close proximity to a source of heat, in the conduits S. This uniform heating of the plastic material is very desirable for my purpose as it enables me to mold with exactitude the most intricate ornamentation and shape. Furthermore, where a potentially reactive molding plastic is used this uniform heating to a high temperature may be carried to the point where reaction is about to take place or is actually initiated, and under these conditions such plastic material is forced into the mold cavity requiring only a minimum of time to complete the final hard, set and molded product. Under these conditions the molded piece B is formed with great exactitude as to dimensions with a minimum amount of fins and under a uniform and positively controlled hydrostatic pressure. The pressure may now be released under the ram X, platen allowed to descend and the cycle of operation repeated as above described.

Figure 2:
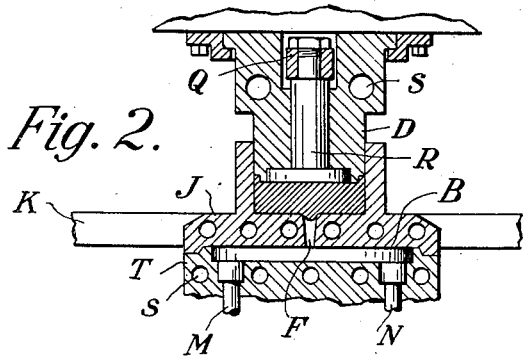
Fig. 2 is a more detailed view of part of Fig. 1 illustrating the position of the parts with the material in the cylinder and prior to the forcing of the material into the mold cavity.

In Fig. 2 I illustrate the condition of the molding cycle prior to the material entering the mold cavity forming the piece B. This view illustrates very clearly the heating obtained from the surfaces of mold member J and plunger D which causes the partially heated material to flow toward and into the passage F. The material in this condition is readily heated to a more uniform and higher degree because of the narrowness of this passage F and because of the high temperature to which the surfaces of this passage are heated.

In Fig. 3 I show the molded piece B being ejected from the mold cavity by means of knockouts M and N. Also I show the ejection of the surplus material formed within the pressure chamber Z and the passage F. It will be noted that the excess material C has been broken from the molded piece B and has been removed from the pressure chamber Z, due to the shrinkage of the material onto the cylindrical undercut portion E. The excess material C is ejected from the plunger D by means of the knockout R.

It is also to be understood that the mold member J may be heated to only a sufficient amount to cause the required movement of partially softened plastic material into the passage F wherein the material is heated to a higher temperature, or heating to a higher temperature may be caused to take place in the mold cavity B, and reaction will thereupon ensue.

In Fig. 4 I illustrate the application of my method to the use of so-called hand molds in which the mold members J' and T' are not directly heated by means of the circulation of steam or water through conduits therein but by contact with the heated platens of a press.

This figure also illustrates how a multiplicity of mold cavities may be supplied with material through a single passage F' and the distributing channel or channels a.

In adapting this type of mold to use with my molding method it is only necessary to form therein a passage and channels required for receiving and distributing the material from the pressure chamber Z which, in this instance, may be a separate member common to any number of molds.

The pressure chamber Z may be permanently mounted in the press after the manner of Figs. 1 and 3 and any number of molds used therewith successively. It will be understood that suitable means will be provided for so positioning the various molds that passages F and F' will register correctly one with the other.

In Fig. 5 I illustrate a form of pressure chamber Z adapted for interchangeable use with molds of the so-called hand type in which a plurality of passages F' are necessary, either for the supplying of a large number of small mold cavities B, or to supply a single mold cavity of large volume. In this instance, the pressure chamber is made bottomless except for the inwardly extending flange b which provides a bearing area for receiving a portion of the hydrostatic pressure generated by the plunger and is consequently held in firm contact with the mold member J'. With this form of pressure chamber the plunger is made to conform roughly to the interior shape of the chamber itself, in order that virtually all of the molding material may be expelled therefrom.

To insure the excess material breaking away from the molded piece, at a point exterior to the surface thereof, the passages F' are countersunk at their outlet end, thus forming a clearly defined line of constriction at c. Due to this being the smallest area the material will naturally rupture at this point, leaving a small frusto-conical projection on the molded piece which may be readily smoothed off without detriment to the appearance of the latter.

The excess material within the passage F' above the line of constriction c will remain integral with that portion clinging to the plunger, as previously described, while the material within the passage below the line c will remain attached to the molded piece. The passage F' will therefore be cleaned automatically of all material during each cycle.

In Fig. 6 I have illustrated the position of the apparatus after the mold has been filled but before the platen A has started on its downward movement. The molded pieces B are shown filling the mold cavities and the excess material C fills the space beneath the plunger D and within the passages F and F' as well as the lateral channel a.

During the upward movement of the platen A the lever d has contacted with the spring pressed plunger e and this in turn has forced the locking member G inward by reason of the projection f acting as a fulcrum and causing the upper end of the locking member to move into engagement with the surface g of the mold member J. It is evident that because of the toggle action the locking member G will remain in the position shown until released by an upward movement of the lever d.

As the platen A moves downward from the position illustrated the mold by reason of the projecting top portion h of the guide i (shown in Fig. 7) will cause the material within the passages F and F' to rupture at the point of smallest area and that further downward movement of the platen A will bring the enlarged end of rod j into contact with the guide k attached to the pressure chamber Z, stripping the latter from off the plunger D.

The mold may now be freely removed from the press and another substituted therefor, after which the above described cycle of operation will be repeated, it being understood that the excess material C will be automatically stripped from the plunger D as covered by the description of Fig 1.

Subsequent to the curing or setting of the molded articles the mold will be opened by forcing the lever d upward and separating the mold members J and T by hand or other means and the molded articles ejected from the mold cavities. To facilitate this, I have shown in one instance a knockout plug or member l.

As previously described, the mold as a unit is interchangeable in the apparatus with other molds of similar outside dimensions and consists broadly of two members J and T designed to co-act with one another and be held together by locking members G, the upper and lower members of the mold being properly positioned relative to each other by means such as dowels m. Members J and T are provided with suitable openings in which are secured the cavity members n and n' by suitable means such as set screws (not shown). These cavity members are necessarily similar but may be designed for the molding of different articles whereby several different articles may be produced coevally. The mold members J and T are provided with openings o and o' registering with the molding cavities n and n' for providing access to any knockout members such as l without having to remove the cavity members from their position within the mold.

By this construction I obtain a greater production from a single press than would be possible were the mold to remain therein during the entire curing or setting cycle, and by reason of this fact am enabled to reduce the labor cost very materially. As a further explanation of this advantage it may be pointed out that the apparatus may be operated by unskilled labor, the only skilled labor required being that employed for opening the molds, ejecting the pieces and seeing that the molds are properly cleaned and reassembled in preparation for the next molding cycle.

I wish to lay particular stress on the fact that the thin stream of plastic material coming in contact with the hot narrow passage is thoroughly and uniformly heated to any degree which such plastic material may require for the particular technical effect desired. It might be stated furthermore, that the drawings do not fully illustrate the actual dimensions of this passage and therefore let it be said that for the production of small articles such as barrels and caps for fountain pens, the area of the passage is only about 3/1000 of a square inch. Of course, in the case of larger articles this area may be made greater, but it is always preferable to keep it as small as possible in order to thoroughly heat the material. In the case of certain large work it is preferable to construct a mold cavity having several passages for the entrance of a plastic material. Under this condition the combined area of these passages is sufficient to permit the proper volume of material to flow within the mold cavity within the time limit required because of the reactivity or setting time of the material to be used. The use of relatively small passages enables me to cause these to break off readily at the junction or close to the junction of the molded piece. In order to add strength, however, it is usually preferable to have the passage terminating at the primary pressure chamber somewhat wider in order to insure that the material will not break off at this junction point.

What I claim is—

1. In a device of the class described, the combination of a press having fixed structural parts including a pair of standards, a connecting head, a reciprocating ram provided with a platen movable between the standards, a pair of cams adjustably mounted on said standards, each cam being provided with a mold stop, a two-part mold with the parts co-acting to provide a mold cavity, the lower mold part being carried by the platen and the upper mold part being adapted to be supported from said stops, means operated by said cams for locking the mold parts together, and a plunger fixedly secured to the head, said upper part of the mold having a pressure chamber adapted to receive the plunger as said upper part is moved by the platen and lower mold part into engagement with the plunger, and said upper part being provided with a passage placing the pressure chamber and mold cavity in intercommunication.

2. In a press, the combination of a pair of standards, a head connecting the standards, a ram mounted below said head for reciprocatory movement between the standards, mold supporting stops carried by the standards, three separate parts positioned in alignment with the axis of movement of the ram, two of said parts co-acting to provide a two-part mold having a mold cavity, a pressure chamber formed in the upper part of said two-part mold and communicating with the mold cavity, the lower of said two mold forming parts being carried by the ram and movable thereby into engagement with the upper of said two parts, said upper part being supported on the lower part when the two parts are in engagement and being supported on said stops when free of said lower part, and the third part constituting a plunger carried by said head, adapted to be received in the pressure chamber and acting to force the contents of the chamber into the mold cavity when the mold is elevated by the ram into engagement with the fixed plunger.

3. In a device of the class described, the combination of three members mounted for relative axial movement, comprising a relatively fixed plunger, and two relatively movable mold members adapted to co-act to form a mold cavity therebetween, one of said members being provided with a pressure chamber constantly open to the mold cavity and adapted to receive the plunger, and a single pressure means movable in one direction for moving the mold members relative to each other into cavity forming position and for causing the plunger to act on the contents of the pressure chamber to force the same into the mold cavity.

4. In a device of the class described, the combination in superposed order of a lifting ram, a lower element of a two-part mold carried by the ram, an upper floating element of said mold, means for supporting said upper element in the path of movement of the lower element and in position to be elevated thereby, said two elements when in superposed engagement co-acting to form a mold cavity therebetween, the upper member having an open top pressure chamber and a passage leading therefrom into the mold cavity, and a fixed plunger positioned above the pressure chamber and adapted to be received in the pressure chamber as it is elevated to force the contents from the same into the mold cavity under the action of the lifting ram when both elements of the mold are lifted by the ram into an elevated position.

5. In a device of the class described, the combination of a vertically movable two-part mold provided with a vertically openable mold cavity and having an inlet into the cavity, means on said mold providing a pressure chamber discharging into said inlet, a fixed plunger mounted above the mold and pressure chamber for forcing the contents of the pressure chamber into the mold cavity as the same is elevated into engagement with the plunger and elevating mechanism including pressure means movable in one direction for sequentially moving the mold parts upwardly into closed position and into engagement with the plunger for causing the plunger to function.

6. In a device of the class described for transfer molding an infusibly thermosetting resinous material, the combination of a press, a mold structure carried in said press and comprising separable top and bottom members coacting when closed to provide a mold cavity, the top member being provided with a pressure chamber and with a passage opening from the pressure chamber into the mold cavity, means to heat the passage and the mold cavity, locking means controlled by the operation of the press for securing together said top and bottom members, and a plunger operable in timed sequence with the locking of said members for moving into said chamber and for forcing the contents thereof through said heated passage and into the heated mold cavity.

7. In a device of the class described for transfer molding an infusibly thermosetting resinous material, the combination of a lower mold member, an upper mold member having a recess on its underside co-acting with the aforesaid recess provided with an open top recess to form a mold cavity, said upper mold member being provided with a pressure chamber having a constricted passage for communication with the mold cavity, means to heat the pressure chamber and the mold cavity, means for locking the members in position to form the mold cavity, and additional means for moving said members relative to each other to and from their locked position and for causing the contents of the heated pressure chamber to discharge through said passage into the heated mold cavity.

8. In a device of the class described, the combination of a press including fixed structural parts, a locking cam carried thereby, means for securing the cam adjustably in position on said fixed parts, a reciprocating ram, a mold operatively connected to be moved to and from a closed position by the reciprocatory movement of the ram, means movable with the ram and operatively connected to the fixed cam for locking the mold in closed position incidental to the movement of the ram in moving the mold into closed position.

9. In a device of the class described, the combination in superposed order of a lifting ram, a lower element of a two-part mold carried by the ram, an upper floating element of said mold, means for supporting said upper element in the path of movement of the lower element in position to be lifted therefrom by the lower element, said two elements when in superposed engagement co-acting to form a closed mold cavity, the upper member having an open top pressure chamber and a passageway leading therefrom into the mold cavity, a fixed plunger positioned above the pressure chamber and adapted to be received into the pressure chamber to force the contents from the same into the mold cavity under the action of the lifting ram when the mold is lifted by the ram into an elevated position, and locking means controlled by an elevating movement of the ram for securing together said two elements when elevated and controlled by a descending movement of the ram for moving said locking means into an inoperative position thus permitting the lower element to escape below the upper element and thus open the mold.

10. In a device of the class described for transfer molding an infusibly thermosetting resinous material, the combination of two separable members co-acting when in engagement to form a mold cavity therebetween, means providing a pressure chamber open to the mold cavity through an interconnecting passage, pressure means including a plunger for the pressure chamber acting on the material in the pressure chamber to force the same therefrom into the mold cavity, means to simultaneously heat the pressure chamber, the passage, and the mold, and cam controlled locking means acting to secure the separable mold members in such cavity forming engagement.

11. In a device of the class described for transfer molding an infusibly thermosetting synthetic resin, the combination of an open top cylinder provided with a pressure chamber and a wall closing the bottom thereof, the wall forming the cylinder being solid and exposed on its external side for air cooling, and said closing wall being provided with a discharge passage leading from the chamber and with a heat medium conducting conduit for heating said closing wall and said discharge passage.

12. In a device of the class described for transfer molding and infusibly thermosetting material, the combination of mold means including two separable parts co-acting to provide a mold cavity therebetween, one of said parts being provided with a pressure chamber constantly opening into the mold cavity, and having a volumetric capacity at least slightly greater than that of the mold cavity, means for heating said pressure chamber and said mold cavity, and a single pressure means for forcing the contents of the pressure chamber into the mold cavity and for securing said two parts in their closed or mold-cavity-forming position.

13. An apparatus for the molding of articles from infusibly thermosetting resinous materials, comprising means provided with a pressure chamber and a mold cavity and including a wall defining a portion of a side of each and separating the same, said wall being provided with conduits receiving a heating medium, and said wall also being provided with a constricted passage for placing the pressure chamber in communication with the mold cavity, in order to subject the material passing through said passage to the heating effect of the medium within the conduits.

14. In apparatus for forming molded articles from infusibly thermosetting resinous materials, the combination of a heating surface over which the material is caused to flow as it becomes plastic, means including a relatively constricted tapered discharge passage leading from said surface, and a heated mold for receiving the heated plastic material from said discharge passage, the aforesaid means being provided with heating conduits for heating all portions of said passage, and the said passage being tapered to facilitate removal of set material therefrom.

15. In a device of the class described, the combination of an open top cylinder forming a pressure chamber and a wall closing the bottom thereof, the wall forming the cylinder being solid and exposed on its external side for air cooling, said closing wall being provided with a discharge passage leading from the chamber and also provided with a heat conducting conduit, and a plunger operating in said pressure chamber and provided with a heat conducting conduit.

16. An apparatus for the molding of infusibly thermosetting materials, comprising a chamber for receiving said material, a mold cavity communicating therewith, means for subjecting the material in said chamber to a positive mechanical pressure and to heat in order to force said heated material into the said mold cavity wherein the material is set to substantially the form of the mold cavity, means to heat the mold cavity to an elevated temperature higher than that in the chamber, and means for automatically ejecting any excess or residue of material from the chamber preparatory to the next molding operation.

17. A combination of a press, a pressure chamber, a plunger for cooperating with the pressure chamber, a mold cavity adapted to be filled with a thermoplastic cementitious composition discharged from the pressure chamber, locking means for holding the mold cavity in closed position, means for ejecting the finished article from the mold cavity, and means for ejecting the excess material from the pressure chamber.

18. A combination of a press, a pressure chamber, means for heating the same, a mechanism for cooperating with the pressure chamber whereby a positive pressure is exerted upon a body of infusibly thermosetting cementitious material therein, a mold cavity communicating with said pressure chamber and adapted to be filled with material from the pressure chamber, means heating the mold cavity, locking means for holding the mold cavity closed, means for ejecting the finished reacted article from the mold cavity, and means for ejecting the reacted excess material from the pressure chamber.

19. In a device of the class described for the molding of infusibly thermosetting resins, the combination of a mold structure provided with a pressure chamber and with a separate mold cavity opening therefrom, means to heat said structure, a plunger operating in said pressure chamber to force the contents therefrom into the mold cavity, means on said plunger to cause excess material in the chamber to adhere to the plunger when the plunger is withdrawn, and means acting when the plunger is withdrawn from the chamber for stripping therefrom any such excess material.

20. In an apparatus for molding articles from an infusibly thermosetting resinous material, the combination of shiftable means forming a pressure chamber, a mold cavity forming therefrom, and a constricted heated separate therebetween, a relatively fixed passage therebetween, a relatively fixed plunger working in the pressure chamber to force the material through the passage and into the mold cavity, means for ejecting the molded article from the mold cavity, and reciprocating power means operable in one direction for forcing the material from the pressure chamber into the mold cavity and operable in the other direction for causing the ejecting means to function.

21. In a device of the class described, the combination of means providing a mold cavity, a pressure chamber in communication therewith and having uniform diameter from end to end, a plunger having a sliding fit in said chamber, means to relatively move the chamber and plunger from a position with the plunger exterior to the chamber to a position with the plunger intruded into the chamber, the intruding end of said plunger having a diameter less than the diameter of the chamber, forming an annular portion at the end of the plunger for receiving excess molding material, and means operatively disposed for stripping any such excess material from the plunger upon withdrawal of the plunger from the chamber.

22. In a device for molding articles from an adhering molding material, the combination of means providing a pressure chamber having an outlet, a plunger co-acting with the pressure chamber to force the material therefrom through said outlet, said plunger being provided with means for causing surplus material to adhere thereto and to be withdrawn from the chamber upon withdrawal of the plunger, means for stripping such withdrawn material from the plunger, and reciprocating pressure means operable in one direction for forcing the plunger into the pressure chamber and operable in the opposite direction to cause in sequence a removal of the plunger from the pressure chamber and an actuation of said stripping means.

23. In a device of the class described for the molding of infusibly thermosetting resins, the combination of a mold cavity, means forming an open end pressure chamber, a wall defining the closed end and provided with an outlet passage leading to the mold cavity and progressively decreasing in cross sectional area away from the chamber, a plunger fitting into said chamber and having means for holding and removing excess material from the chamber and from said outlet passage while the plunger is retracted from the chamber, and means for then stripping the thus removed excess material from the plunger.

24. An apparatus for the molding of articles from infusibly thermosetting cementitious materials, comprising a structural part forming a pressure chamber having a closed end and an open end, a plunger movable into the open end, means for heating the contents of said chamber to induce plasticity of the material, means providing a mold cavity, a passage leading from the closed end of the pressure chamber to the mold cavity, said passage being relatively long compared to its other dimensions and being constructed at one place to provide a weak section of material at this point in the molded article, and means on said plunger to remove any residue of material at the closed end of the pressure chamber through said chamber and out of the open end thereof preparatory to the next molding operation.

25. In a device of the class described for transfer molding an infusibly thermosetting material, the combination of means forming a pressure chamber, a mold cavity, and an elongated constricted passage connecting the chamber and cavity, said constricted passage progressively decreasing in cross sectional area to a point of minimum cross sectional area, the end of said passage having the maximum cross sectional area opening into the pressure chamber, and means to remove any residue of material in the pressure chamber and with such residue the tapered residue from the constricted passage.

26. In a device of the class described for transfer molding an infusibly thermosetting material, the combination of means providing a mold cavity, a pressure chamber having uniform diameter from end to end and connected to said mold cavity, means to heat the pressure chamber and the mold cavity, a plunger having a sliding fit in said chamber, means to relatively move the chamber and plunger from a position exterior to the chamber to a position intruded into the chamber, the intruding end of said cylinder having a diameter less than the diameter of the chamber thereby to form an annular portion at the end of the plunger for receiving excess material and for removing the same upon withdrawal of the plunger from the chamber, and stripping means operably controlled by the movement of the plunger from the pressure chamber for stripping such withdrawn excess material from the plunger.

27. In a device of the class described for the molding of infusibly thermosetting resins, the combination of a mold cavity, means forming a pressure chamber open at one end, a wall defining the closed end and provided with an outlet passage leading to the mold cavity and progressively decreasing in cross sectional area away from the chamber, a plunger fitting into said chamber and having means for holding and removing excess material from the chamber and from said outlet passage when the plunger is retracted from the chamber, thus clearing the machine preparatory to the next molding operation.

28. In a device of the class described, the combination of a press frame, a ram movable vertically relative thereto, a mold including an upper and a lower member, the lower member being carried by the ram and provided on its upper face with a mold cavity, means for supporting the upper member in the path of lifting movement of the ram, a pressure chamber on the upper member in communication with the mold cavity, a plunger on top of said press frame, said plunger cooperating with said pressure chamber to eject material into the mold cavity, and a knockout member extending through the lower member with the upper end normally flush with the bottom of the cavity and adapted to be elevated therefrom to eject the molded article from said cavity, the lower end of said knockout member extending below the lower member and arranged to be elevated by lowering of the ram, thereby to cause an ejection of the molded article incidental to the lowering of the ram.

29. In a device of the class described for transfer molding an infusibly thermosetting synthetic resin, the combination of a heated mold element provided with an open top mold cavity, a floating closure for covering said open cavity positioned above said mold element, means for heating and feeding the infusibly thermosetting material under pressure through said closure to said cavity when closed by said closure, pressure means operable in one direction for lifting the mold element into position to engage said closure and means for insuring a fit of said closure in engagement with said element to close the mold cavity to its operable dimensions.

30. In a device of the class described, the combination of a fixed plunger, a floating member provided with a pressure chamber aligned with and below said plunger and adapted to receive the plunger when raised into engagement therewith, mold means provided with a mold cavity below and aligned with said floating member, reciprocatory pressure means movable in one direction for lifting the mold means and with it the floating member into engagement with the plunger, and movable in the opposite direction for lowering said mold means and floating member away from the plunger and means for establishing communication between the mold cavity and the pressure chamber when the floating member and mold means are in engagement.

31. In a device of the class described for transfer molding an infusibly thermosetting material, the combination of means forming an open top pressure chamber adapted to receive a charge of moldable material, a plunger for closing the pressure chamber and for placing the material therein under pressure, means providing a mold in communication with the pressure chamber and having a mold cavity adapted to be opened to permit the ejection therefrom of articles molded therein, means to heat the pressure chamber and mold in order to first plasticize and then set the material in the mold, and power means operable to automatically cause in sequence a functioning of the plunger to cause the forcing of the material under pressure from said pressure chamber into the mold cavity, the removal of the plunger from the pressure chamber to open the same to receive a fresh charge of material for each molding operation, opening of the mold cavity, and emptying of the apparatus of all reacted material.

32. Apparatus for the transfer molding of articles out of a permanently infusibly thermosetting resin, comprising a press having a fixed upper head and a movable lower head, means for moving the lower head, a lower mold portion on said movable head, a mating upper mold portion and a pressure chamber floatingly mounted between said heads, a passage interconnecting the pressure chamber and mold, a plunger mounted on said fixed upper head in alignment with the pressure chamber, whereby upward movement of the lower head closes the mold and moves the mold and pressure chamber into engagement with the plunger and forces the resin from the pressure chamber through the passage and into the mold, means to heat the pressure chamber, passage, and mold in order to plasticize, react, and cause setting of the resin, and means operable upon downward movement of the lower head to eject and completely remove the set material from the mold cavity, the pressure chamber, and the passage, thus emptying said members preparatory to the next molding operation.

33. In a molding machine, the combination with a mold and a pressure chamber mounted in communication therewith, of a plunger relatively movable into and out of said pressure chamber, means for relatively moving the pressure chamber and the plunger in order to eject material from the pressure chamber into the mold, said plunger having means adapted to engage the surplus material remaining in the chamber to cause said surplus material to remain on the plunger when the plunger and pressure chamber are separated, and means for thereafter stripping said surplus material from the plunger.

34. Apparatus for the transfer molding of articles out of a permanently infusibly thermosetting resin, comprising a mold, a pressure chamber, an elongated constricted tapered passage interconnecting the pressure chamber and the mold, a plurality of simultaneously operating heating means for heating the pressure chamber, the constricted passage, and the mold in order to plasticize and continuously and progressively and uniformly heat the plastic material during the filling of the mold, so as to cause the material to react and rapidly set in the mold, and means to eject and completely remove the set material from the apparatus at the end of each molding operation preparatory to the next molding operation.

35. Apparatus for the cyclically repeated transfer molding of articles out of a permanently infusibly thermosetting resin comprising a press having a fixed upper head and a movable lower head, means for moving the lower head, a lower mold portion on said movable head, a mating upper mold portion and a pressure chamber floatingly mounted between said heads, a passage interconnecting the pressure chamber and mold, a plunger mounted on said fixed upper head in alignment with the pressure chamber whereby upward movement of the lower head closes the mold and moves the mold and pressure chamber into engagement with the plunger and forces the resin from the pressure chamber through the passage and into the mold, means to heat the pressure chamber, passage, and mold in order to plasticize, react, and cause setting of the resin, and means to completely remove the set material from the apparatus at the end of each molding cycle preparatory to the next molding operation.

LOUIS E. SHAW.